June 6, 1944.      H. MARTIN ET AL      2,350,787
KEY HEAD
Filed Oct. 22, 1940
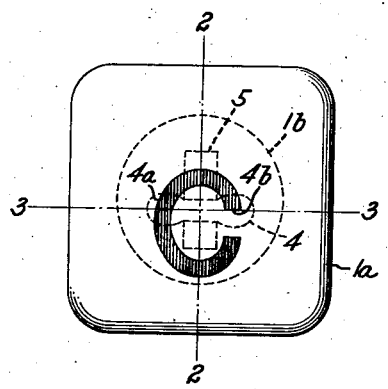
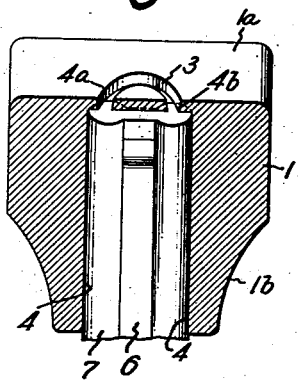
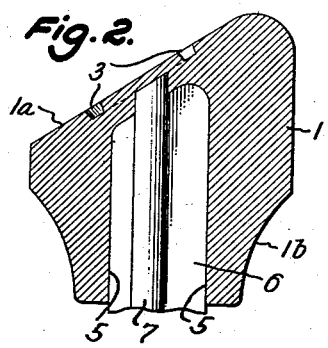
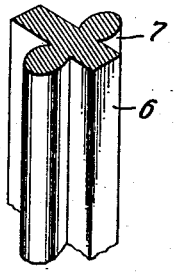

Patented June 6, 1944

2,350,787

UNITED STATES PATENT OFFICE 2,350,787

KEY HEAD

Hans Martin and Walter Franz, Erfurt, Germany; vested in the Alien Property Custodian Application October 22, 1940, Serial No. 362,296
In Germany October 21, 1939

1 Claim. (Cl. 18—59)

The invention relates to key heads for calculating machines, in which key bodies and characters consist of differently colored plastic or sprayable synthetic materials.

For these machines, ordinarily, keys are used that in comparison with their small diameter have a great height and instead of an otherwise ordinary key shank have an aperture in which the suitable machine part is fastened. This form of construction, especially the characteristic key head form, in comparison with the usual flat typewriter machine key heads, makes special methods of preparation necessary in order to be able to make them economically.

It is, moreover, difficult and time-consuming if the key shank hole and a passage continuing from this to the key head surface are used for spraying in the differently colored character composition, since the residue of the character material remains in the key shaft hole and must be removed therefrom with considerable difficulty. In like manner, the passages for the supplying of the character-forming material could be distributed only on the circumference of the key shank hole, which involves certain drawbacks. Even the arrangement already known in typewriter machine heads with passages which pass through the body of the head, outside the key shank hole, up to the bottom of the head cannot be used directly in the present type of head since in it comparatively long injection passages or dies corresponding to the same are required in the casting mold, which would have only slight durability because of the limited cross-section that is possible due to space requirements.

These difficulties are eliminated by the present invention in that the injection passages and the key shank hole are combined into a single continuous passage, for instance, cross-shape or T-shape in cross-section. In this way, the die for forming these holes is provided with a simple continuous reinforcement.

In the drawing, an illustrative example of the invention is shown in a number of views in which:

Fig. 1 shows a key head embodying the invention viewed from above;

Figs. 2 and 3 are lateral sections of the same on lines 2—2 and 3—3, respectively, of Fig. 1; and Fig. 4 is a perspective view in partial section of a die for molding the passages.

The key head shown by way of example in Fig. 1 is one of the manipulating keys of a calculating machine that have a different shape from the other number keys. The use of the invention, however, is not limited to this shape of head, it being applicable just as well to the number keys or other shaped parts to be provided with characters.

The quadrangular key head body 1 exhibits an inclined surface 1a above, while below it passes into an abruptly constricted sleeve 1b. In the surface 1a, the character 2 to be made of a material of another color is embedded (Fig. 1), so that the surface of the character and that of the key body are located in one plane. A character channel 3 cut out of the key head surface for the purpose (Figs. 2 and 3) has walls substantially perpendicular to the surface of the head surface and a flat channel bottom of the usual depth. Outlet openings 4a, 4b of an injection passage 4 that is led up from the bottom of the head body intercept the channel at a number of places. In the same direction as the injection passage 4 and standing at right angles to the same in the lengthwise direction is the usual opening 5 for the reception of a key shank or key lever at the bottom of the head, which is closed at the top by an inclined end wall at a suitable distance from the key-head surface. The injection passage 4, on the contrary, passes directly into the character channel 3, forming the above-mentioned discharge openings 4a, 4b, which are given dimensions such that in all cases a part of the body of the key-head more or less enclosed by the line trace of the character remains in connection with the rest of the key-head body.

The die for forming the passages presents a cruciform cross-section with the laterally projecting parts 6, 7, as seen in Fig. 4 and as shown in position in the passages in Figs. 2 and 3. Of these parts, the part 6 intended to form the key shank hole is provided with sharply angular outer edges, while the die part 7 for forming the injection passage has rounded off edges and is constricted in cross-section at the places of attachment to the rest of the die form, so as to prevent any possible escape of the contents of the passage toward the inside of the head. The top surface of the stamp is cut back to conform to the above-described shape and length of the injection passage 4 and the shank opening 5.

The manufacture of this type of head is accomplished just as with typewriter machine key heads by simultaneous molding of the outer shape and the inner passages of the key head body, the die reinforced by its constructional form permitting rapid penetration in the still plastic head material. Because of its ribbed form, there is no danger that the die will bend or break off during ordinary molding or pressing operations. The character material subsequently is sprayed, in the most simple way, into the finished key head from the bottom openings of the injection passage 4, by positioning injection nozzles in the openings. It should be noted that a core part must be present in the key shank hole during the spraying in order to prevent penetration of the sprayed material. This core for the key shank hole is preferably combined in one piece with the injection nozzle, it being possible to place the nozzle in position by means of the guide thus provided, directly and in the shortest possible time, through the openings of the injection passages.

We claim:

A method of forming a key head comprising a body portion of plastic material and a character channel in the upper surface of the body portion filled with a differently colored material, which comprises molding said body portion by pressing plastic material in a mold shaped to form the exterior surface of said body portion and said character channel with a die comprising two longitudinal portions extending laterally at right angles, one of said die portions penetrating into communication with said character channel, thereafter inserting a core member corresponding in cross-section to the shank to be inserted in said key head into the space formed by the other of said die portions and injecting differently colored material into said character channel through the remaining space formed by the first-mentioned portion of said die.

HANS MARTIN.
WALTER FRANZ.